J. R. JOHNSTON.
VEHICLE TIRE.
APPLICATION FILED MAY 12, 1916.
1,209,712.
Patented Dec. 26, 1916.
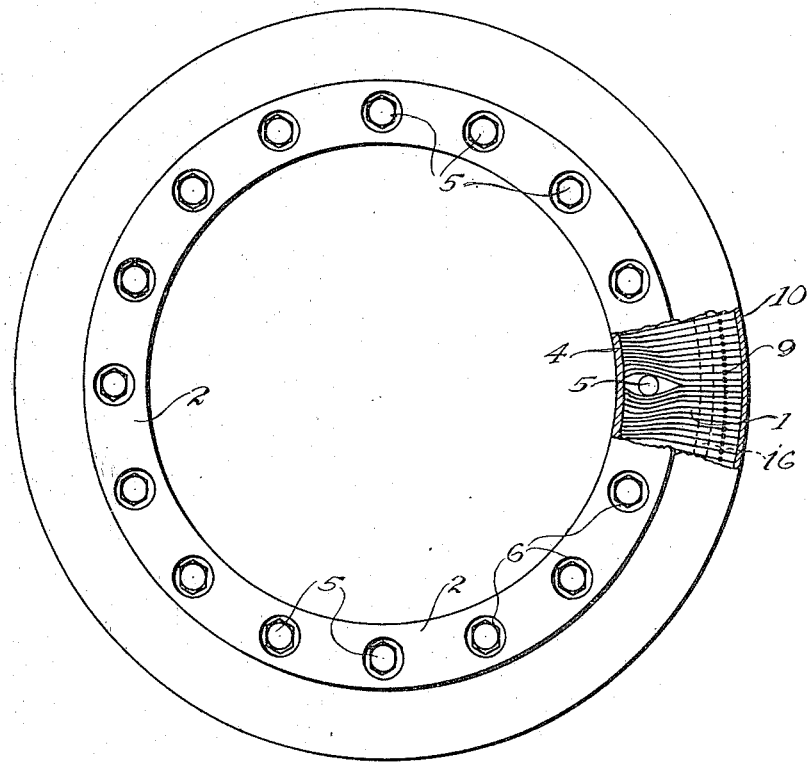
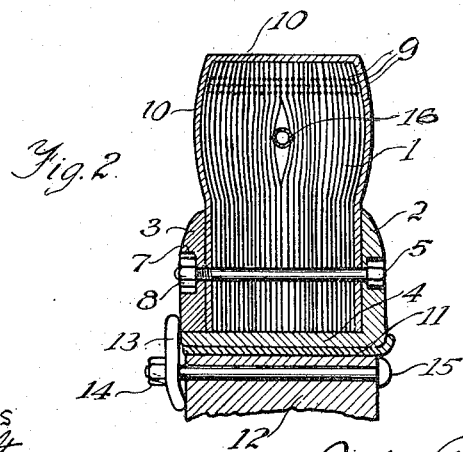

UNITED STATES PATENT OFFICE.

JOHN ROBT. JOHNSTON, OF HAMMOND, INDIANA.

VEHICLE-TIRE.

1,209,712.  Specification of Letters Patent.  Patented Dec. 26, 1916.

Application filed May 12, 1916.  Serial No. 97,012.

*To all whom it may concern:*

Be it known that I, JOHN ROBERT JOHNSTON, a citizen of the United States of America, and a resident of Hammond, county of Lake, and State of Indiana, have invented certain new and useful Improvements in Vehicle-Tires, of which the following is a specification.

The main objects of this invention are to provide an improved form of vehicle tire; and to provide an improved resilient vehicle tire that is puncture proof, durable and comparatively inexpensive.

An illustrative embodiment of this invention is shown in the accompanying drawings, in which:

Figure 1 is a side elevation of the improved tire with the clamping ring and the covering partly broken away. Fig. 2 is a sectional view of the same, showing it demountably arranged on the felly of a vehicle wheel.

In the construction shown in the drawings, the vehicle tire comprises a mass of filaments or bristles 1 which may be of any suitable material, as for example bamboo fiber, ratan fiber, bast fiber, Japanese fiber, rice-root fiber, palmyra fiber, Tampico, istle or pita fiber, spring wire, etc. The bristles are radially disposed so as to receive the thrust endwise thereof, and the inner ends of the mass are gripped and secured between a pair of clamping rings 2 and 3. The ring 2 is provided with a flat annular rim 4, which acts as a bearing base for the inner ends of the bristles 1. Means are provided for securing the rings 2 and 3 together, so as to squeeze and retain the bristles 1, and comprise a series of transversely disposed and equally spaced bolts 5 having their heads seated in counter sunk holes 6 in ring 2. Ring 3 is also provided with counter sunk holes 7 for receiving the nuts 8 of bolts 5. The outer ends of the bristles are stitched together, broom fashion, as shown at 9, in compact form so as to prevent them from spreading when subjected to pressure. A cover 10 of canvas, leather, rubber or other suitable material may be placed around the mass of bristles 1 for excluding mud, sand, water, etc., and avoiding direct wear on the bristles. The tire thus made up may be demountably secured on a felly rim 11 secured to the felly 12 of the vehicle wheel and may be held thereon by a clip 13 in a well known manner. The clip 13 is secured by the nut 14 of the bolt 15 in the usual way.

Means for causing the mass of bristles 1 to evenly divide and bulge outward intermediate their ends when weight is placed thereon are provided and comprise a loosely placed hollow tubular ring 16 located in the center of the mass of bristles midway between the tread surface and the edge of the clamp rings 2 and 3.

A very light, resilient, strong and durable tire may thus be made at a low cost, and such a tire will not puncture and cause the trouble customary to the pneumatic tires. Being of light weight, such a tire is for many purposes much to be preferred to solid rubber or rubber cushion tires.

Although but one specific embodiment of this invention is herein shown and described, it will be understood that the construction shown may be altered and details omitted without departing from the spirit of this invention as defined by the following claims.

I claim:

1. A vehicle tire comprising a mass of radially disposed bristles, and means dividing said mass for causing the bristles to bulge outward.

2. A vehicle tire comprising a mass of radially disposed bristles, means for holding the outer ends of said bristles together in compact form, means for rigidly securing the inner ends of said bristles, and a ring located in the middle of said mass of bristles for causing said bristles to bulge outward intermediate their ends when subjected to pressure.

Signed at Hammond this 28th day of April, 1916.

JOHN ROBT. JOHNSTON.